May 10, 1949. G. PIPIA ET AL 2,469,783
CLOTHESLINE CLAMPING DEVICE
Filed May 12, 1947
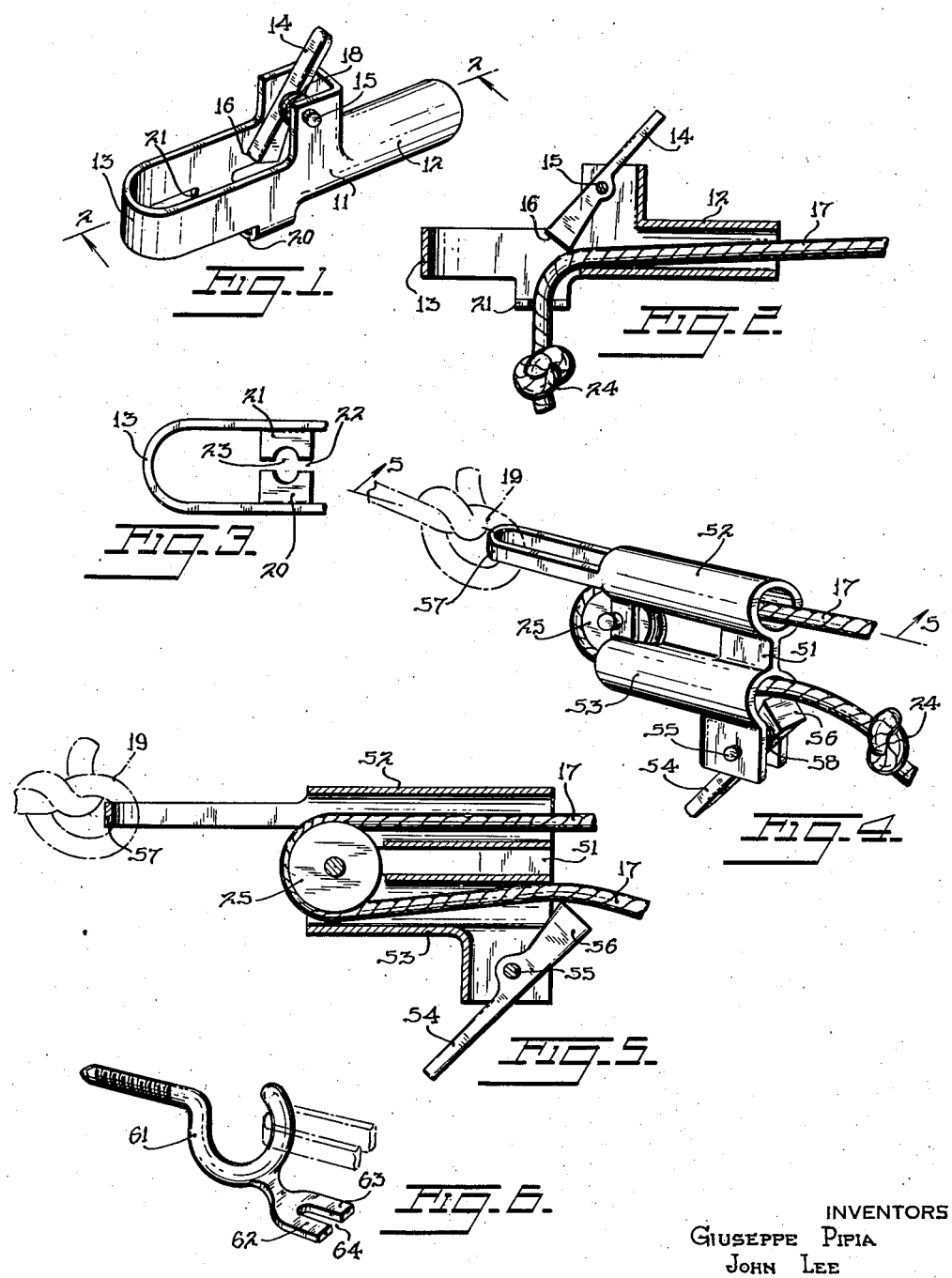
INVENTORS
GIUSEPPE PIPIA
JOHN LEE
BY
ATTORNEY Patented May 10, 1949

2,469,783

UNITED STATES PATENT OFFICE 2,469,783

CLOTHESLINE CLAMPING DEVICE

Giuseppe Pipia and John Lee, New York, N. Y.

Application May 12, 1947, Serial No. 747,538

2 Claims. (Cl. 24—134)

The present invention relates to clamping devices for clotheslines.

It is an object of the invention to provide a simple and efficient clamping device which will permit a clothesline, rope or similar cordage to be drawn to a desired degree of tautness.

A further object of the invention is to provide a clamping device of this character in which the line may be readily released in order to lessen the tension or to remove the line.

The invention contemplates that the inclusion in the device of a stop member adapted to engage a knot in the line, be so arranged that the line will not fall to the ground upon releasing the clamping device. It is a feature of the invention that the stop member may be constructed integrally with the clamping device or it may form a part of a hook which holds the clamping device when the line is in use.

Another object of the invention is to provide a clamping device which will hold the line securely but which will not cut or damage the line while it is so held.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view of an embodiment of the invention.

Fig. 2 is a longitudinal vertical sectional view taken on the line 2—2 of Fig. 1.

Fig. 3 is a fragmentary plan view of the closed end of the device illustrated in Fig. 1.

Fig. 4 is a perspective view of a modified form of the invention.

Fig. 5 is a longitudinal vertical sectional view taken on the line 5—5 of Fig. 4.

Fig. 6 is a perspective view of a screw-hook, in which a part of the invention has been embodied in the hook.

The clamping device for clotheslines, according to the form of the invention shown in Figs. 1 to 3, includes a body member 11 having a tubular line guiding portion 12 and a U-shaped end portion 13. A gripping lever 14 is pivotally mounted in the body member 11 on a pin 15, the gripping end 16 of lever 14 being held in engagement with the line 17 by the action of a coil spring 18 mounted on the pin 15. The end portion 13 is shaped for engagement with a hook (not shown), or it may be secured to the end of another length of line (not shown).

A pair of inwardly extending ears 20 and 21 are provided at the end of the body member 11 adjacent the U-shaped portion 13. Their ends are spaced to form a slot 22 as shown in Fig. 3. They are further shown as having arcuate cut away portions shaped to form a circular aperture 23. Slot 22 is sufficiently wide so that line 17 may be readily passed therethrough and circular aperture 23 is of sufficient diameter so that line 17 will pass freely therein but it is small enough to prevent passage of the knot 24 in the end of line 17. Slot 22 may be made sufficiently wide to permit free passage of the line and the cut away portions may be omitted. Tubular guide portion 12, however, is large enough to pass knot 24.

In operation, line 17 is passed through tubular guide portion 12 of body member 11. Gripping lever 14 is pressed to permit the free end of line 17 together with knot 24 to pass into the U-shaped end portion 13. Line 17 is then inserted through slot 22 so that it may pass freely through circular aperture 23 between ears 20 and 21, but knot 24 will not pass therethrough. This may be seen in Fig. 2. By pulling on the free end of line 17, it may be drawn to any desired degree of tautness and gripping end 16 of lever 14 will permit the line to pass thereunder. The tension in line 17, however, tends to bring gripping end 16 into contact with line 17 with increased pressure, in addition to the pressure provided by spring 18, so that when the desired tautness has been reached, it will be maintained.

When it is desired to release the tension in line 17, pressure is applied to lever 14 thereby disengaging gripping end 16 from contact with line 17. Line 17 will then pass freely through the device until knot 24 engages ears 20 and 21. The line may then be removed from the device by passing the line through slot 22, to free knot 24 from engagement with ears 20 and 21.

The action of ears 20 and 21 serves to prevent the line 17 from falling to the ground upon disengagement of gripping end 16 of lever 14.

Figs. 4 and 5 illustrate a modified form of the invention in which a pulley 25 is provided to reverse the direction of line 17. This is particularly advantageous where the device must be located in close proximity to a wall or pole which would render it awkward to pull the line in the same direction in which it is to be drawn taut.

Two tubular guide portions 52 and 53 are provided in body member 51 each being sufficiently large to pass knot 24. Lever 54 is pivoted at pin 55 and gripping end 56 is held in engagement with line 17 by the combined action of spring 58 and the tension in line 17. Closed end 57 may be provided with ears as indicated at 20 and 21 of Fig. 2 or these ears may be omitted as shown in Fig. 4 and the device used with a hook 61 as shown in Fig. 6 having projecting ears 62 and 63 adapted to grip knot 24 and to permit line 17 to pass freely through slot 64.

It will thus be seen that the invention provides a simple and compact gripping device together with knot gripping ears which will prevent the line from falling to the ground when the gripping lever is released. Moreover, the device is relatively inexpensive to manufacture by reason of the small number of parts required for its construction.

While we have illustrated and described the preferred embodiments of our invention, it is to be understood that we do not limit ourselves to the precise constructions herein disclosed and the right is reserved to all changes and modifications coming within the scope of the invention as defined in the appended claims.

Having thus described our invention, what we claim as new, and desire to secure by United States Letters Patent is:

1. A clothesline clamping device for a clothesline having a knot in the end thereof, comprising a one-piece body member having a tubular line guiding portion and a U-shaped end portion continuing from one end of said tubular portion for engagement with a supporting hook, said tubular portion being of a diameter to permit the knotted end of the line to be passed therethrough from the end opposed to said U-shaped end portion to depend from the other end thereof between the sides of said U-shaped end portion, a gripping lever pivotally mounted on the top of said tubular portion and spring pressed in a direction to clamp the line passing through said tubular portion against the inside face of the bottom wall of said tubular portion, and a pair of opposed ears depending from the sides of said U-shaped end portion adjacent the end of said tubular portion, said ears having their free bottom ends directed toward each other and formed with opposed arcuate cutouts forming a circular aperture of a diameter to permit the line to freely slide therethrough but of a diameter smaller than the knot to restrain sliding movement of the line to prevent complete disengagement of the line from said body member in the inoperative pivoted position of said gripping member.

2. A clothesline clamping device for a clothesline having a knot in the end thereof, comprising a one-piece body member having a tubular line guiding portion and a U-shaped end portion continuing from one end of said tubular portion for engagement with a supporting hook, said tubular portion being of a diameter to permit the knotted end of the line to be passed therethrough from the end opposed to said U-shaped end portion to depend from the other end thereof between the sides of said U-shaped end portion, a gripping lever pivotally mounted on the top of said tubular portion and spring pressed in a direction to clamp the line passing through said tubular portion against the inside face of the bottom wall of said tubular portion, and a pair of opposed ears depending from the sides of said U-shaped end portion adjacent the end of said tubular portion, said ears having their free bottom ends directed toward each other and formed with opposed arcuate cutouts forming a circular aperture of a diameter to permit the line to freely slide therethrough but of a diameter smaller than the knot to restrain sliding movement of the line to prevent complete disengagement of the line from said body member in the inoperative pivoted position of said gripping member, said ears having their ends spaced from each other forming slots extending from diametrically opposite sides of said circular aperture through which said line may be forced to free the knotted end of the line from said ears to be passed through said tubular portion and completely disengaged from said body member when desired.

GIUSEPPE PIPIA.
JOHN LEE.

REFERENCES CITED

The following references are of record in the file of this patent:

UNITED STATES PATENTS

| Number | Name | Date |
| --- | --- | --- |
| 424,022 | Park | Mar. 25, 1890 |
| 545,043 | Attwood | Aug. 27, 1895 |
| 575,064 | Hegel | Jan. 12, 1897 |
| 670,129 | Combs | Mar. 19, 1901 |
| 1,036,232 | Hedberg | Aug. 20, 1912 |
| 1,472,042 | Bettinardi | Oct. 30, 1923 |
| 1,758,744 | Haubert | May 13, 1930 |